US 012378750B2

United States Patent
Kumeuchi et al.

(10) Patent No.: US 12,378,750 B2
(45) Date of Patent: Aug. 5, 2025

(54) WORKING VEHICLE

(71) Applicant: TAKEUCHI MFG. CO., LTD., Nagano (JP)

(72) Inventors: Kengo Kumeuchi, Nagano (JP); Shumpei Okutani, Nagano (JP); Tetsuya Matsumoto, Nagano (JP)

(73) Assignee: TAKEUCHI MFG., CO., LTD., Nagano (JP)

( * ) Notice: Subject to any disclaimer, the term of this patent is extended or adjusted under 35 U.S.C. 154(b) by 671 days.

(21) Appl. No.: 17/830,464

(22) Filed: Jun. 2, 2022

(65) Prior Publication Data

US 2023/0039973 A1 Feb. 9, 2023

(30) Foreign Application Priority Data

Aug. 5, 2021 (JP) .................... 2021-128742

(51) Int. Cl.
*E02F 9/08* (2006.01)
*B60Q 1/04* (2006.01)
(Continued)

(52) U.S. Cl.
CPC .......... *E02F 9/0858* (2013.01); *B60Q 1/0408* (2013.01); *B60R 16/03* (2013.01);
(Continued)

(58) Field of Classification Search
CPC ......... E02F 9/0858; E02F 9/0866; E02F 9/16; E02F 9/22; E02F 9/0891; E02F 3/325; B60Q 1/0408; B60R 16/03; F15B 15/18
See application file for complete search history.

(56) References Cited

U.S. PATENT DOCUMENTS 10,472,805 B1   11/2019   Kumeuchi et al.
2012/0224942 A1*   9/2012   Cherney .............. E02F 9/2087
                                                  903/902
(Continued)

FOREIGN PATENT DOCUMENTS

JP    2018172887 A   * 11/2018
JP    2018172941 A   * 11/2018
(Continued)

*Primary Examiner* — Drew J Brown
(74) *Attorney, Agent, or Firm* — Stephen J. Weyer, Esq.; Stites & Harbison, PLLC

(57) ABSTRACT

A working vehicle including a work unit hydraulically driven, a hydraulic pump driven by an electric motor, a power source and a power supply circuit which supply electric power to the electric motor, and a main body supporting them, a first fixation mechanism fixing a first fixation component to the main body includes a first conductor, a first conduction member making the first conductor and the main body electrically conductive to each other, and a second conduction member making the first conductor and the first fixation component electrically conductive to each other, and is configured such that the main body and the first fixation component are electrically conductive to each other via the first conductor and the first and second conduction members and are equal in electric potential, and the main body is electrically conductive and equal in electric potential to a ground pole of the power supply circuit.

20 Claims, 10 Drawing Sheets

(51) Int. Cl.
*B60R 16/03* (2006.01)
*E02F 9/16* (2006.01)
*E02F 9/22* (2006.01)
*F15B 15/18* (2006.01)

(52) U.S. Cl.
CPC .............. *E02F 9/0866* (2013.01); *E02F 9/16* (2013.01); *E02F 9/22* (2013.01); *F15B 15/18* (2013.01)

(56) References Cited

U.S. PATENT DOCUMENTS

| | | | |
|---|---|---|---|
| 2015/0081177 A1* | 3/2015 | Kawasaki | G06K 7/10009 701/50 |
| 2019/0345695 A1 | 11/2019 | Kumeuchi et al. | |
| 2021/0270004 A1* | 9/2021 | Durkin | E02F 3/422 |
| 2024/0191476 A1* | 6/2024 | Roehlk | B60K 35/10 |
| 2024/0191707 A1* | 6/2024 | O'Konek, Jr. | F04B 39/005 |

FOREIGN PATENT DOCUMENTS

| | | | | |
|---|---|---|---|---|
| JP | 6463537 B1 * | 2/2019 | | E02F 3/30 |
| JP | 2019127156 A * | 8/2019 | | B60K 1/04 |
| WO | WO-2015156422 A1 * | 10/2015 | | E02F 9/0866 |

\* cited by examiner

VIII-VIII

PORTION XI

WORKING VEHICLE

CROSS-REFERENCE TO RELATED APPLICATION

This application is based upon and claims the benefit of priority of the prior Japanese Patent Application No. P2021-128742, filed on Aug. 5, 2021, and the entire contents of which are incorporated herein by reference.

TECHNICAL FIELD

The present invention relates to a working vehicle including a hydraulic pump which is driven by an electric motor and a power source which supplies electric power to the electric motor.

BACKGROUND ART

Heretofore, as a working vehicle configured to include a travel unit including, for example, crawlers or tires and a work unit configured to be hydraulically driven, there have been known, for example, an excavator, a loader, and a carrier.

Recently, there has been developed a working vehicle in which an electric motor powered by a battery drives a hydraulic pump which supplies pressure oil to, for example, a work unit (see PTL 1: Japanese Patent No. 6,463,537).

SUMMARY OF INVENTION

Technical Problem

A working vehicle in which a hydraulic pump is driven by an electric motor, such as that discussed as an example in PTL 1, is equipped with a power source and a power supply circuit which supply electric power to the electric motor. In this respect, the inventors of the present invention conducted a study of such an electric motor-driven working vehicle and found that, depending on structures of the vehicle, noise originating mainly from a power supply circuit (electromagnetic waves in a specific frequency band) may be greatly radiated into the air. Such noise becomes a cause of impediments to, for example, communications and is, therefore, required to be prevented or reduced.

Solution to Problem

In response to the above issue, one or more aspects of the present invention are directed to providing a working vehicle equipped with a configuration in which a hydraulic pump is driven by an electric motor and capable of preventing or reducing any radiation of noise originating mainly from a power supply circuit into the air.

In view of the above, the following embodiments are described below.

A working vehicle including a work unit which is hydraulically driven, a hydraulic pump which is driven by an electric motor, a power source and a power supply circuit which supply electric power to the electric motor, and a main body which supports the work unit, the hydraulic pump, the electric motor, the power source, and the power supply circuit, includes a plurality of fixation components fixed to the main body, and a first fixation mechanism which fixes a first fixation component of the plurality of fixation components to the main body, includes a first conductor, a first conduction member which makes the first conductor and the main body electrically conductive to each other, and a second conduction member which makes the first conductor and the first fixation component electrically conductive to each other, and is configured such that the main body and the first fixation component are electrically conductive to each other via the first conductor, the first conduction member, and the second conduction member and are equal in electric potential to each other, wherein the main body is configured to be electrically conductive and equal in electric potential to a ground pole of the power supply circuit.

Particularly, it is favorable that the working vehicle is a working vehicle including a work unit which is hydraulically driven, a control room which is used to perform an operation on the work unit, a hydraulic pump which is driven by an electric motor, a power source and a power supply circuit which supply electric power to the electric motor, and a main body which supports the work unit, the control room, the hydraulic pump, the electric motor, the power source, and the power supply circuit. It is favorable that the control room is configured as an open-type canopy including one or a plurality of front poles (first fixation component) erected (vertically arranged) at a front portion of the main body configured as a floor portion, one or a plurality of rear poles (second fixation component) erected at a rear portion of the main body, and a roof portion supported by the front pole and the rear pole. It is favorable that the front pole has an outer surface painted and a front flange (first fixed portion) provided at a lower end portion thereof, on which a first conduction plate (first conductor) with the whole surface thereof plated is placed, and is fixed to the main body with inclusion of a first bolt (first conduction member) inserted into a first insertion hole formed in a communicating manner in the first conduction plate and the front flange and screwed to the main body and a second bolt (second conduction member) inserted into a second insertion hole formed in the first conduction plate and screwed to the front flange. It is favorable that a fixation mechanism (first fixation mechanism) with which the front pole is fixed to the main body is configured such that the main body and the front pole are electrically conductive to each other via the first conduction plate, the first bolt, and the second bolt and are equal in electric potential to each other and at least the first conduction plate is covered in an unexposed state by a resin mat laid on the floor portion. It is favorable that the rear pole has an outer surface painted and a rear flange (second fixed portion) provided at a lower end portion thereof, on which a second conduction plate (second conductor) with the whole surface thereof plated and further painted on such plating is placed, and is fixed to the main body with inclusion of a third bolt (third conduction member) inserted into a third insertion hole formed in a communicating manner in the second conduction plate and the rear flange and screwed to the main body and a fourth bolt (fourth conduction member) inserted into a fourth insertion hole formed in the second conduction plate and screwed to the rear flange. It is favorable that a fixation mechanism (second fixation mechanism) with which the rear pole is fixed to the main body is configured such that a region with which a head of the third bolt in the second conduction plate is in abutting contact directly or via a washer and a region with which a head of the fourth bolt is in abutting contact directly or via a washer are configured to be in a state in which a plating surface is exposed outside, so that the main body and the rear pole are electrically conductive to each other via the second conduction plate, the third bolt, and the fourth bolt and are equal in electric potential to each other. It is favorable that the main body is configured to be electrically conductive and equal in electric potential to a ground pole of the power supply circuit. Moreover, it is favorable that the control room includes a lamp arranged therein and a power supply wire for supplying electric power to the lamp is arranged inside at least one of the front poles or the rear poles. Moreover, it is favorable that the main body has an outer surface painted and includes a screw portion to which the first bolt is screwed and a screw portion to which the third bolt is screwed, which are configured to be in a paintless state by retap processing. Moreover, it is favorable that the second conduction plate has an outer surface painted and includes an opening portion peripheral border region of the third insertion hole and an opening portion peripheral border region of the fourth insertion hole, which are configured to be in a paintless state by masking processing.

Moreover, it is favorable that the working vehicle further includes an equipment room in which the power source is mounted and the equipment room includes a cover for performing opening and closing, a striker provided at the cover, and a hook provided at the main body, the striker being engageable with and disengageable from the hook, includes one or both of a configuration in which the cover and the striker are not electrically conductive to each other and a configuration in which the main body and the hook are not electrically conductive to each other, and is configured to include a conduction cable connecting the cover and the main body in such a manner that the cover and the main body are electrically conductive and equal in electric potential to each other.

Advantageous Effects of Invention

According to aspects of the present invention, in a working vehicle equipped with a configuration in which a hydraulic pump is driven by an electric motor, it becomes possible to prevent or reduce any radiation of noise originating mainly from a power supply circuit into the air.

DESCRIPTION OF EMBODIMENTS

Figure 1:
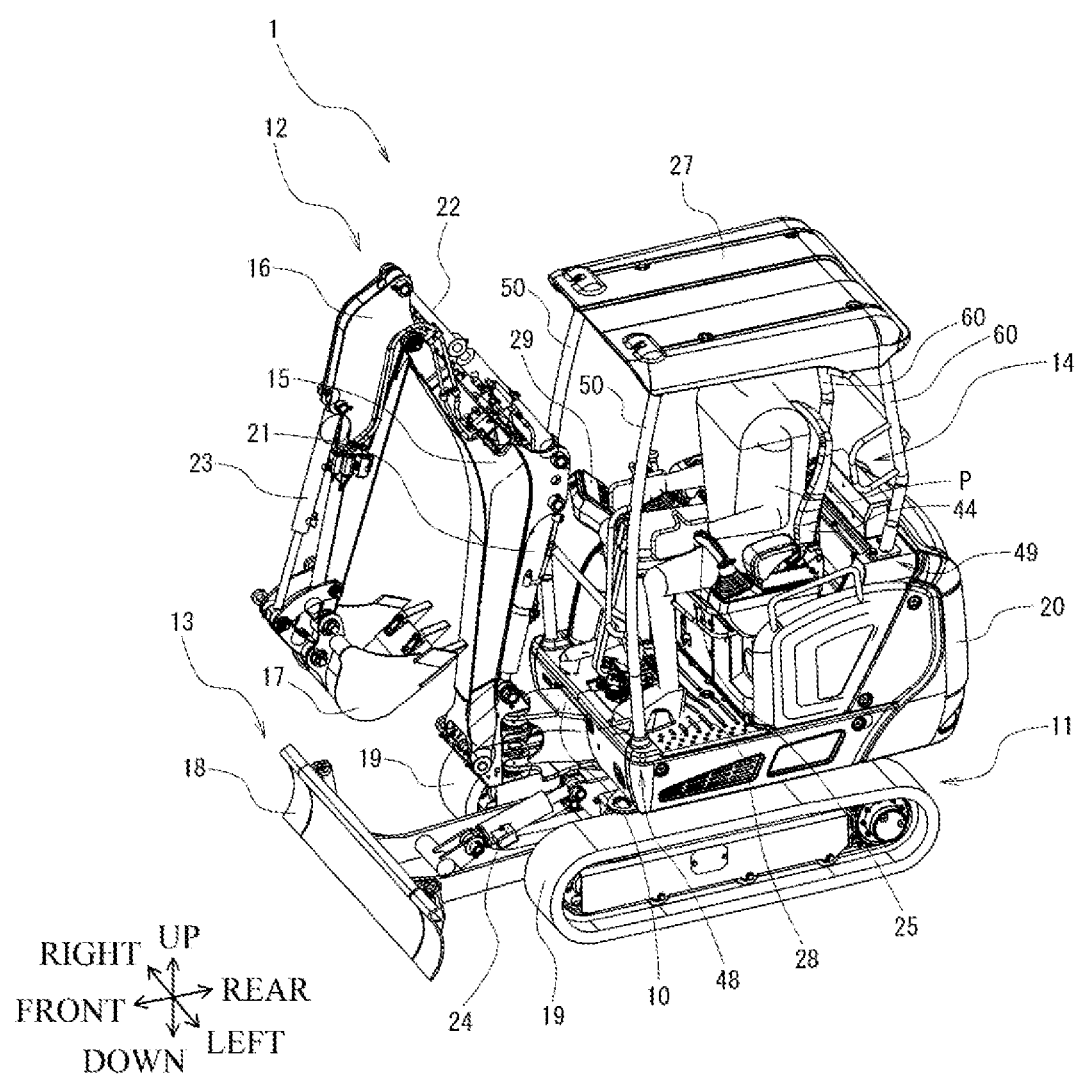
FIG. 1 is a perspective view illustrating an example of a working vehicle according to an embodiment of the present invention.
Figure 2:
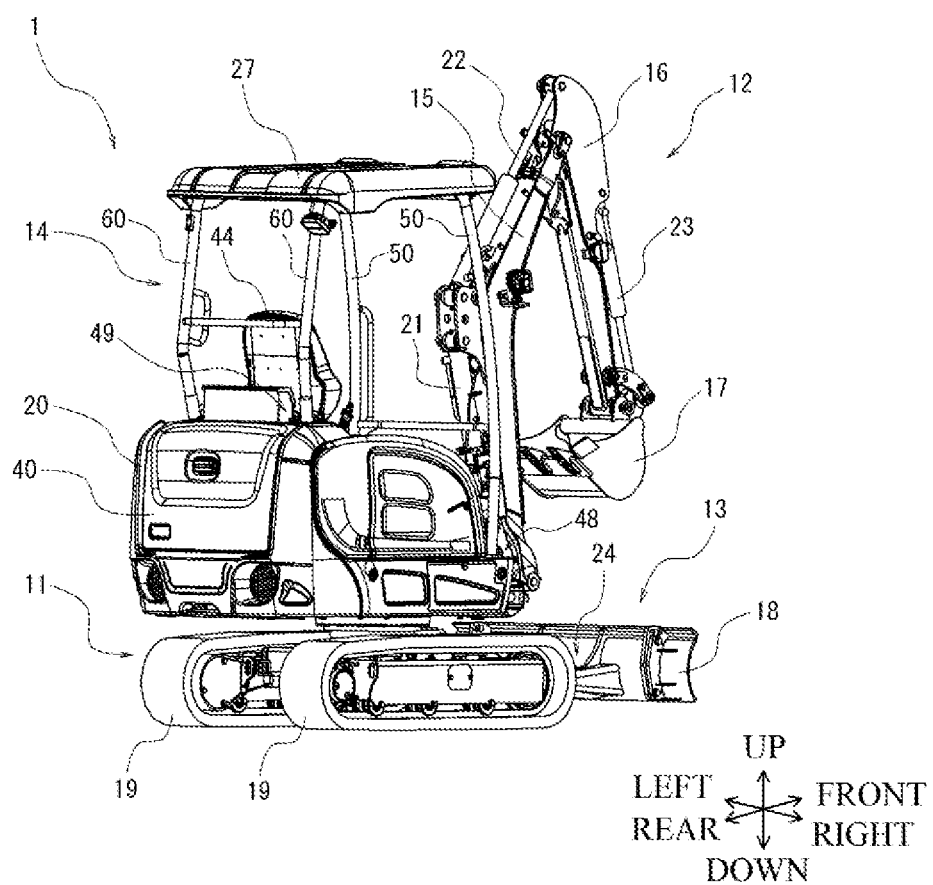
FIG. 2 is a perspective view illustrating the example of the working vehicle according to the embodiment.

An embodiment of the present invention will be described in detail below with reference to the drawings. FIG. 1 is a perspective view (schematic diagram) as viewed from a front left side illustrating an example of a working vehicle 1 according to the present embodiment, and FIG. 2 is a perspective view (schematic diagram) as viewed from a rear right side. Furthermore, for the purpose of illustration, up and down, left and right, and front and rear directions may be represented by arrows in the figures. Moreover, in all of the figures for use in describing the embodiment, members having the same functions are assigned the respective same reference characters, and the repetitive description thereof may be omitted.

First, the entire configuration of the working vehicle 1 is described. While, here, an excavator which travels with crawlers driven by, for example, a hydraulic motor is described as an example, the present embodiment is not limited to this.

The working vehicle 1 is configured to include, as illustrated in FIG. 1 and FIG. 2, a travel unit 11 which includes a pair of right and left crawlers 19, a work unit (for example, a shovel unit 12 or a blade unit 13) which is hydraulically driven, a control room 14 which is used to operate the travel unit 11 and the work unit 12 or 13, a hydraulic pump which is driven by an electric motor and supplies pressure oil (the hydraulic pump and the electric motor being not illustrated), and an equipment room 20, in which a power source 31 and a power supply circuit 30 which supply electric power to the electric motor are mounted. Here, configurations of, for example, the shovel unit 12, the control room 14, and the equipment room 20 are supported by a main body 10. As an example, while the main body 10 according to the present embodiment is configured to include, for example, a rib block and a floor frame connected to the rib block, the present embodiment is not limited to this.

Here, a configuration which supplies electric power to the electric motor is described. Specifically, as illustrated in the circuit diagram (schematic view) of FIG. 4, the power supply circuit 30 is configured to include the power source 31 as an element. In the present embodiment, a power source pack 35 including, for example, the power source 31, a DC-DC converter 36 which converts a direct-current voltage output from the power source 31, and other electrical circuits (not illustrated) is mounted in the equipment room 20. Direct-current electricity output from the DC-DC converter 36 is used to drive, for example, equipment 38 of the 24 volt (V) system and equipment 39 of the 12 V system included in the working vehicle 1. Furthermore, the power source 31 to be used in the present embodiment includes, for example, a lithium-ion storage battery and is configured to be connectable to an external power source (not illustrated) (for example, a commercial power supply of alternating-current 100 V) via an inverter 37 for recharging. However, the present embodiment is not limited to this, but can use, for example, another type of storage battery or a fuel battery. Furthermore, in addition to the power source 31, a lead storage battery is mounted as an auxiliary power source 32 to be used for, for example, supplying of electric power at start-up. However, with regard to the auxiliary power source 32, the present embodiment is also not limited to this.

Next, the control room 14 is configured to include, for example, a seat 44, on which a worker P rides and sits, various operating levers 25 and operating switches for operating actuations of, for example, the travel unit 11, and a display unit 29 which displays various pieces of vehicle information. The control room 14 according to the present embodiment is an open-type canopy. However, the control room 14 can be configured as a closed-type cabin (not illustrated).

Next, the work units are described. First, the shovel unit 12 includes a boom 15 which is pivotally connected to the front portion of the main body 10 via a boom bracket (not illustrated) in such a way as to be swingable up and down, and an arm 16. Furthermore, the shovel unit 12 can have a configuration which does not include the boom bracket. Additionally, the shovel unit 12 includes an attachment (for example, a bucket) 17 which is pivotally connected to the forefront portion of the arm 16 in such a way as to be swingable up and down. The boom 15, the arm 16, and the attachment 17 are driven by hydraulic cylinders 21, 22, and 23, respectively.

On the other hand, the blade unit 13 includes a blade 18 which is pivotally connected to the front portion of the travel unit 11 in such a way as to be swingable up and down. The blade 18 is driven by a hydraulic cylinder 24.

Mechanisms used to drive the above-mentioned hydraulic cylinders 21, 22, 23, and 24 include, for example, hydraulic pumps which are driven by drive sources (specifically, an electric motor) and control valves (not illustrated). Furthermore, the other mechanisms (for example, a drive mechanism and a control mechanism) for use in travel motion and work in the working vehicle 1 are similar to those in a known working vehicle (here, an excavator), and, therefore, the detailed description thereof is omitted.

Furthermore, as mentioned above, electrical noise may be generated from the power supply circuit 30 configured to include the power source 31, and, with regard to an issue in which such noise is radiated into the air, the inventors of the present invention conducted a study of the phenomenon and measures against such an issue. As a result, the inventors found that, particularly, in a case where the DC-DC converter 36 was incorporated in the power supply circuit 30, larger noise might occur.

Here, the inventors found that, with regard to a configuration of the working vehicle 1 including a plurality of fixation components fixed to the main body 10, depending on such a configuration, large noise might occur. More specifically, the inventors found that, in a case where the fixation components were not electrically conductive to the main body 10 and were in a state of having a difference in electrical potential from the main body 10 and, additionally, in a case where the main body 10 was not electrically conductive to a ground pole 33 of the power supply circuit 30 and were in a state of having a difference in electrical potential from the ground pole 33, noise radiated from the power supply circuit 30 was more greatly radiated from the fixation components into the air while propagating through, for example, power supply lines arranged adjacent to the fixation components. Furthermore, examples of each fixation component according to the present embodiment include a front pole 50 and a rear pole 60 described below, an exterior (cover-like member) which covers, for example, the front surface, side surfaces, rear surface, top surface, and bottom surface of the main body 10, and a case for, for example, various operating levers 25, the operating switches, and the display unit 29.

Particularly, the inventors determined that, in a case where a power supply line for supplying electric power to a lamp 43 provided at a roof portion 27 was arranged inside the front pole 50 (or similarly even in a case where the power supply line was arranged inside the rear pole 60), larger noise might occur. The inventors determined that, as a cause for this, noise radiated from the power supply circuit 30 serving as a generation source was propagating through, for example, the power supply line and was then being radiated into the air from a vehicle component element (in this case, the front pole 50 or the rear pole 60) which was in a state of not being electrically conductive (a state of not being electrically conductive to the ground pole 33 of the power supply circuit 30 and having a difference in electrical potential therefrom).

Moreover, the inventors found that, in a case where a power supply line for supplying electric power from the power source 31 to an electric motor was arranged inside the equipment room 20, larger noise might occur. The inventors found that, as an example of a cause for this, noise radiated from the power supply circuit 30 serving as a generation source was propagating through, for example, the power supply line and was then being radiated into the air from a vehicle component element (in this case, a cover 40 for opening and closing the opening portion of the equipment room 20) which was in a state of not being electrically conductive (a state of not being electrically conductive to the ground pole 33 of the power supply circuit 30 and having a difference in electrical potential therefrom).

In the following description, a configuration for attaining a solution to the above-mentioned issues is described. As mentioned above, the working vehicle 1 according to the present embodiment includes a plurality of fixation components fixed to the main body 10. Here, out of the plurality of fixation components, the front pole 50 (described below) is taken as an example of a first fixation component and the rear pole 60 (described below) is taken as an example of a second fixation component. However, the present embodiment is not limited to these configurations.

First, an outline configuration of the control room 14 according to the present embodiment is described. The control room 14 includes a major portion of the floor portion thereof (excluding, for example, an inspection lid) which is configured with the front upper surface of the main body 10. Moreover, the control room 14 includes one or a plurality of (for example, two) front poles 50 erected at the floor portion, one or a plurality of (for example, two) rear poles 60 erected at the rear upper surface of the main body 10, and the roof portion 27 supported by the front poles 50 and the rear poles 60. Here, the lamps (for example, light-emitting diode (LED) lamps) 43 are arranged at the roof portion 27, and a power supply line for supplying electric power is arranged inside one of (or both of) the right and left front poles 50. Furthermore, a configuration in which the power supply line is arranged inside the rear pole 60 can be employed.

As mentioned above, the control room 14 is configured as an open-type canopy. Therefore, a component member which is exposed outside and is subjected to, for example, rain water needs to be painted to prevent, for example, corrosion. Specifically, each of the front pole 50 and the rear pole 60 has an outer surface painted. An example of the painting method includes, after performing foundation processing, performing cation electrodeposition coating and then performing overpaint. Furthermore, a paint film formed on the outer surface in the above-mentioned way has a property of not being electrically conductive.

Figure 5:
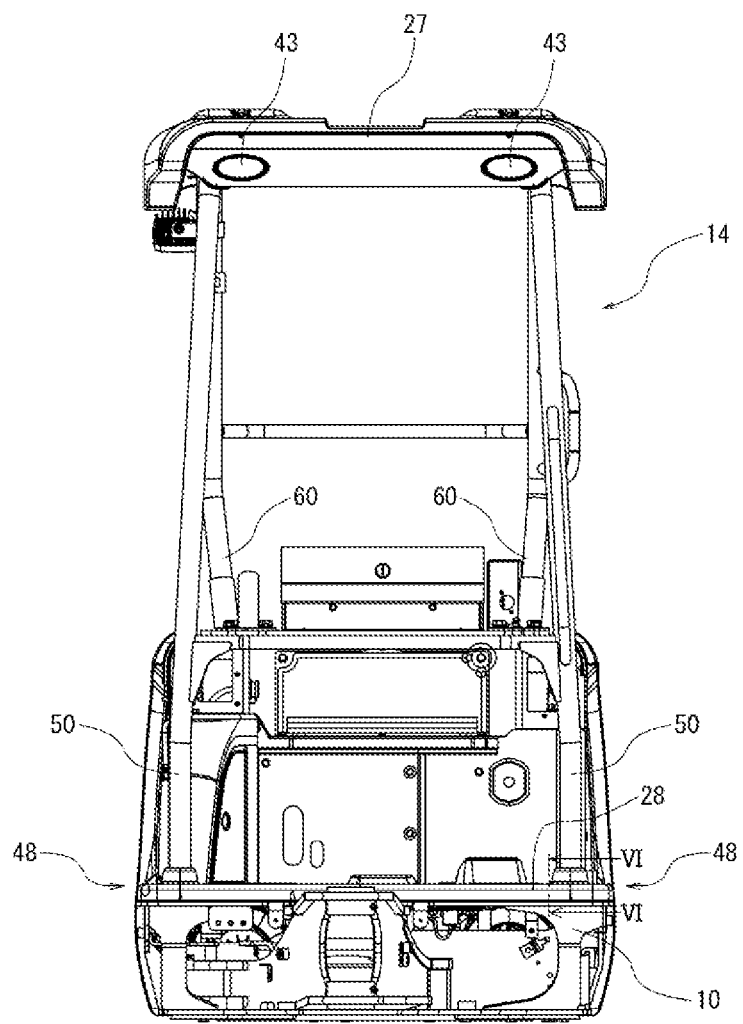
FIG. 5 is a front view illustrating examples of a main body, front poles, and rear poles of the working vehicle illustrated in FIG. 1.
Figure 6:
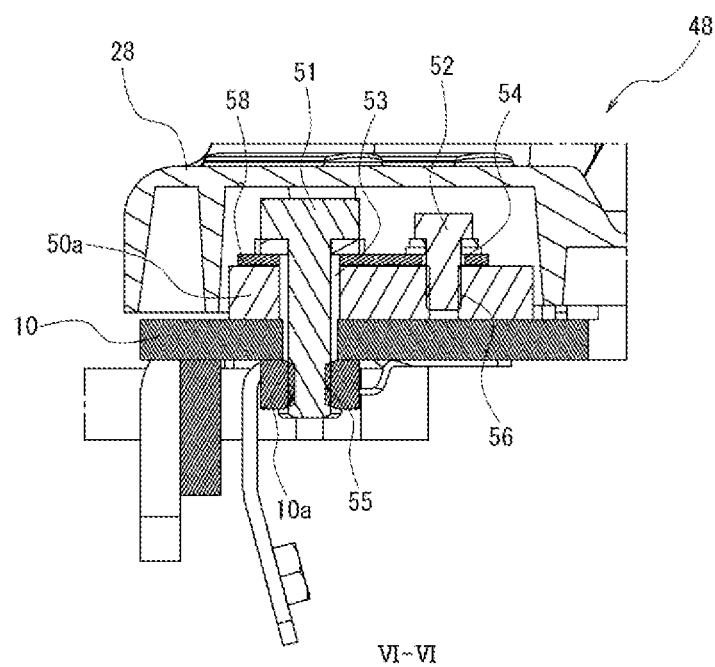
FIG. 6 is a sectional view taken along line VI-VI in FIG. 5.

Next, a fixation mechanism (hereinafter referred to as a "first fixation mechanism") 48 with which the front pole 50 is fixed to the main body 10 is described. As illustrated in FIG. 5 and FIG. 6 (a sectional view taken along line VI-VI in FIG. 5), in the first fixation mechanism 48, the front pole 50 is fixed to the main body 10 in a state of causing a first conduction plate 58 serving as a first conductor having electrical conductivity to directly (or via an intervening member) come into abutting contact with (in this case, being placed on) a front flange 50a serving as a first fixed portion provided at a predetermined region (specifically, a lower end portion). Here, the first fixation mechanism 48 includes a first bolt 51 serving as a first conduction member inserted into a first insertion hole 53 formed in a communicating manner in the first conduction plate 58 and the front flange 50*a* and screwed to the main body 10 (specifically, a screw portion 55 of a nut 10*a* welded to the main body 10) and a second bolt 52 serving as a second conduction member inserted into a second insertion hole 54 formed in the first conduction plate 58 and screwed to the front flange 50*a* (specifically, a screw portion 56 formed in the front flange 50*a*). Accordingly, the first fixation mechanism 48, in which the front pole 50 is fixed to the main body 10, is configured such that the main body 10 and the front pole 50 are electrically conductive to each other via the first conduction plate 58, the first bolt 51, and the second bolt 52 and are equal in electric potential to each other. Furthermore, two first fixation mechanisms 48 provided at right and left sides have the same basic configuration, but can have respective configurations changed as appropriate in, for example, shape depending on a relationship in arrangement or shape of surrounding mechanisms.

Moreover, the first conduction plate 58 according to the present embodiment is covered by a resin mat 28 laid on the floor portion and is configured to be in an unexposed state. Accordingly, since the first conduction plate 58 is able to be made in an unexposed state of not being directly subjected to rain water, it is possible to omit paint on the outer surface. As an example, the first conduction plate 58 has a configuration in which the whole surface thereof is plated (subjected to plating having electrical conductivity, such as zinc plating, chrome plating, nickel plating, tin plating, silver plating, or gold plating) with use of a metallic material of, for example, the plate shape or block shape (furthermore, in a case allowable for strength, a resin material also being employable). This configuration enables attaining simplification of a manufacturing process and a reduction in cost of paint.

Figure 7:
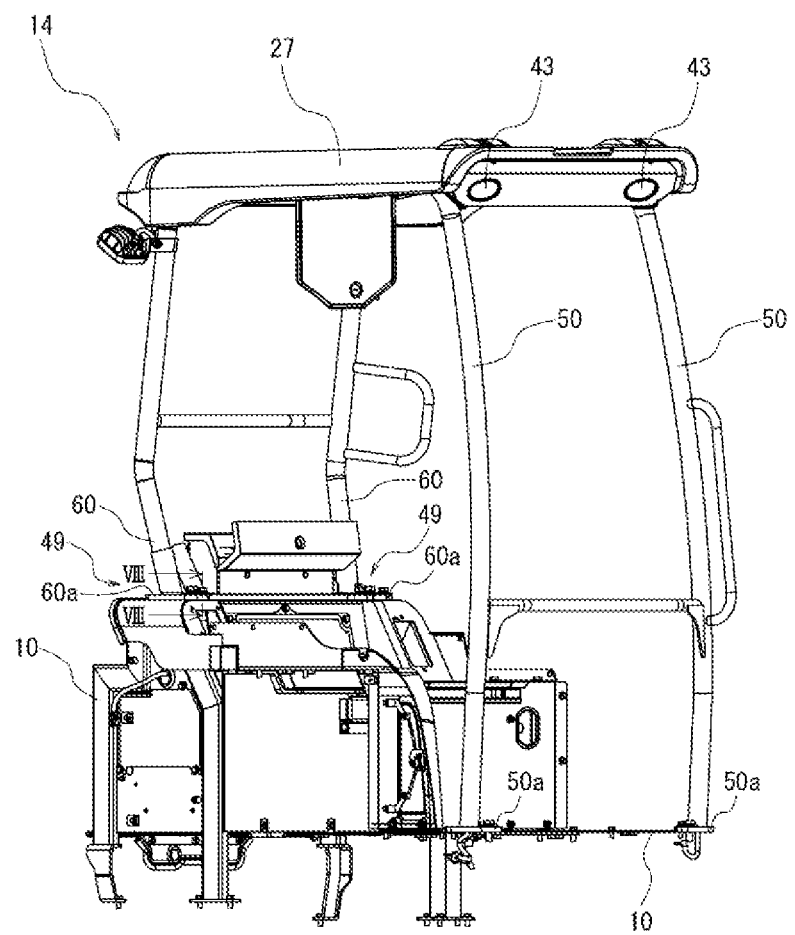
FIG. 7 is a perspective view illustrating the examples of the main body, front poles, and rear poles of the working vehicle illustrated in FIG. 1.
Figure 8:
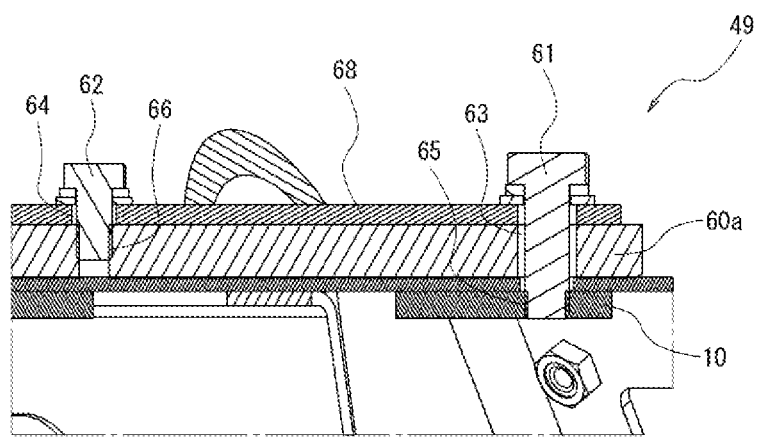
FIG. 8 is a sectional view taken along line VIII-VIII in FIG. 7.

Next, a fixation mechanism (hereinafter referred to as a "second fixation mechanism") 49 with which the rear pole 60 is fixed to the main body 10 is described. As illustrated in FIG. 7 and FIG. 8 (a sectional view taken along line VIII-VIII in FIG. 7), in the second fixation mechanism 49, the rear pole 60 is fixed to the main body 10 in a state of causing a second conduction plate 68 serving as a second conductor having electrical conductivity to directly (or via an intervening member) come into abutting contact with (in this case, being placed on) a rear flange 60*a* serving as a second fixed portion provided at a predetermined region (specifically, a lower end portion). Here, the second fixation mechanism 49 includes a third bolt 61 serving as a third conduction member inserted into a third insertion hole 63 formed in a communicating manner in the second conduction plate 68 and the rear flange 60*a* and screwed to the main body 10 (specifically, a screw portion 65 formed in the main body 10) and a fourth bolt 62 serving as a fourth conduction member inserted into a fourth insertion hole 64 formed in the second conduction plate 68 and screwed to the rear flange 60*a* (specifically, a screw portion 66 formed in the rear flange 60*a*). Accordingly, the second fixation mechanism 49, in which the rear pole 60 is fixed to the main body 10, is configured such that the main body 10 and the rear pole 60 are electrically conductive to each other via the second conduction plate 68, the third bolt 61, and the fourth bolt 62 and are equal in electric potential to each other. Furthermore, two second fixation mechanisms 49 provided at right and left sides have the same basic configuration, but can have respective configurations changed as appropriate in, for example, shape depending on a relationship in arrangement or shape of surrounding mechanisms.

Moreover, the second conduction plate 68 according to the present embodiment is configured to be in a state in which a part thereof is exposed outside. Thus, since the exposed part is in a state of being directly subjected to, for example, rain water, it becomes necessary to perform paint on the outer surface. As an example, the second conduction plate 68 has a configuration in which the whole surface thereof is plated (subjected to plating having electrical conductivity, such as zinc plating, chrome plating, nickel plating, tin plating, silver plating, or gold plating) with use of a metallic material of, for example, the plate shape or block shape (furthermore, in a case allowable for strength, a resin material also being employable) and paint is applied onto the plating. Specifically, the painting method includes, after performing foundation processing, performing plate processing and then performing overpaint on the whole outer surface of the second conduction plate 68. Here, a paint film formed on the outer surface has a property of not being electrically conductive.

However, in the second conduction plate 68, the whole outer surface remaining in a state of being painted results in a state of not being electrically conductive as mentioned above. Therefore, the second conduction plate 68 according to the present embodiment is configured such that a region with which a head of the third bolt 61 is in abutting contact directly or via a washer and a region with which a head of the fourth bolt 62 is in abutting contact directly or via a washer are in a state in which a plating surface is exposed outside. Specifically, an opening portion peripheral border region of the third insertion hole 63 and an opening portion peripheral border region of the fourth insertion hole 64 are configured to be in a paintless state by masking processing, so that, in each of the opening portion peripheral border regions, a plating surface is in a state of being exposed outside and, thus, the above-mentioned electrical conduction is attained.

Next, the main body 10 is described. The main body 10 is configured to be in a state in which a part thereof is exposed outside. Thus, since the exposed part is in a state of being directly subjected to, for example, rain water, it becomes necessary to perform paint on the outer surface. Furthermore, for the purpose of promoting the efficiency of a painting process, not only the exposed part but also the whole outer surface is painted. Specifically, as with the front pole 50 and the rear pole 60 as described above, the painting method includes, after performing foundation processing, performing cation electrodeposition coating and then performing overpaint on the whole outer surface of the main body 10. Here, a paint film formed on the outer surface has a property of not being electrically conductive.

However, in the main body 10, the whole outer surface remaining in a state of being painted results in a state of not being electrically conductive as mentioned above. Therefore, the main body 10 according to the present embodiment is configured such that the screw portion 55 to which the first bolt 51 is screwed and the screw portion 65 to which the third bolt 61 is screwed are brought into a paintless state by retap processing (processing for, after performing paint, performing tap processing on the applicable screw portion to remove paint and cause a metallic surface to be exposed outside) and, thus, the above-mentioned electrical conduction is attained.

Figure 4:
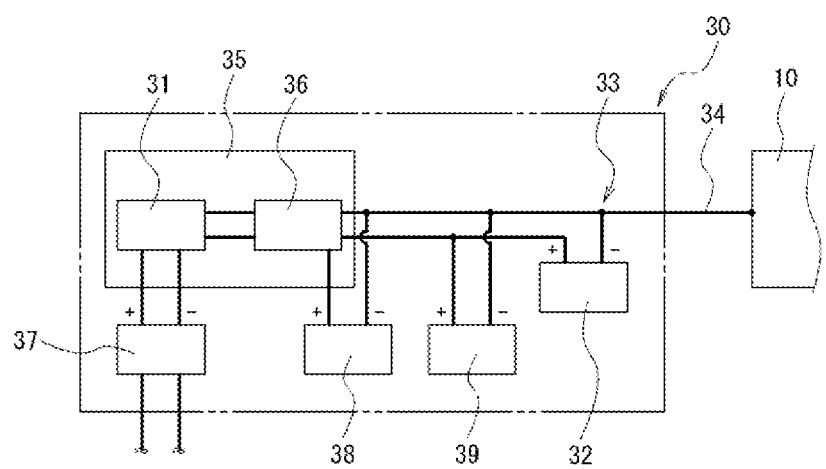
FIG. 4 is a circuit diagram of a power supply circuit of the working vehicle illustrated in FIG. 1.

Moreover, as illustrated in FIG. 4, the main body 10 is configured to be electrically conductive and equal in electric potential to the ground pole 33 of the power supply circuit 30. In the present embodiment, the minus pole of the auxiliary power source (specifically, a lead storage battery) 32 is set as the ground pole 33 of the power supply circuit 30. Additionally, the main body 10 and the minus pole of the auxiliary power source 32 are electrically connected to each other via a conduction member (for example, a conduction cable or a conduction bolt) 34. However, the present embodiment is not limited to this.

The working vehicle 1 according to the present embodiment includes the above-described configuration, thus being able to implement a configuration in which the front pole 50 and the rear pole 60, the main body 10, and the ground pole 33 of the power supply circuit 30 are electrically conductive to each other. As a result, it is possible to prevent or reduce a phenomenon (i.e., reduce the amount of radiation) in which noise generated from the power supply circuit 30 propagates through, for example, a power supply line and is then radiated into the air as a large amount of noise from a vehicle component element (in this case, the front pole 50 or the rear pole 60) which is in a state of not being electrically conductive (in a state of not being electrically conductive to the ground pole 33 of the power supply circuit 30 and having a difference in electrical potential therefrom).

Figure 3:
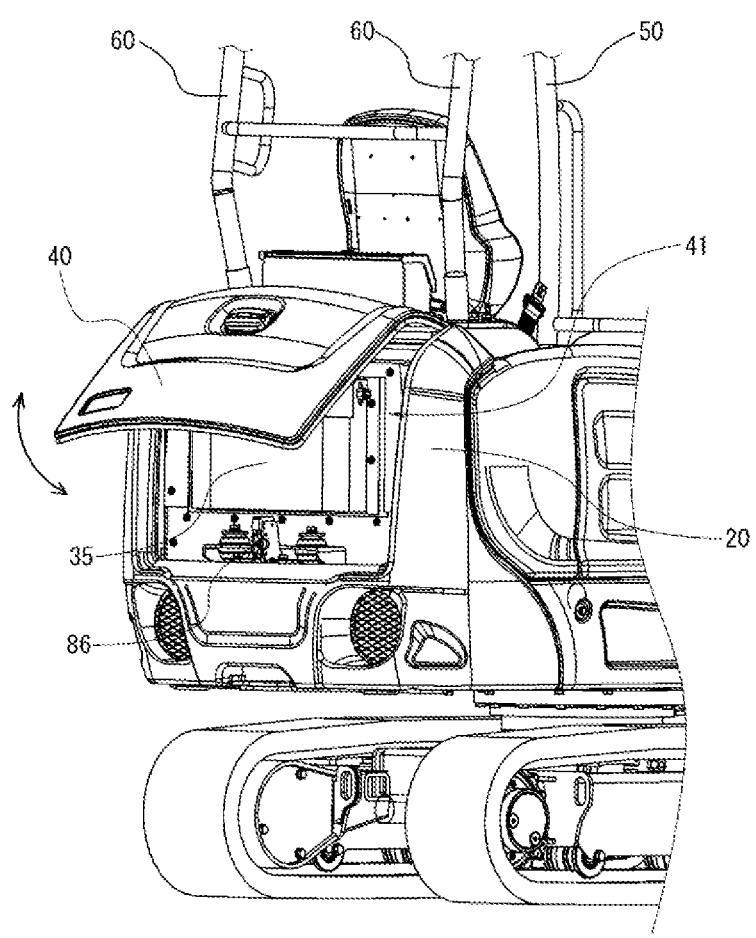
FIG. 3 is an explanatory diagram illustrating an opening and closing state of a cover of the working vehicle illustrated in FIG. 1.
Figure 9:
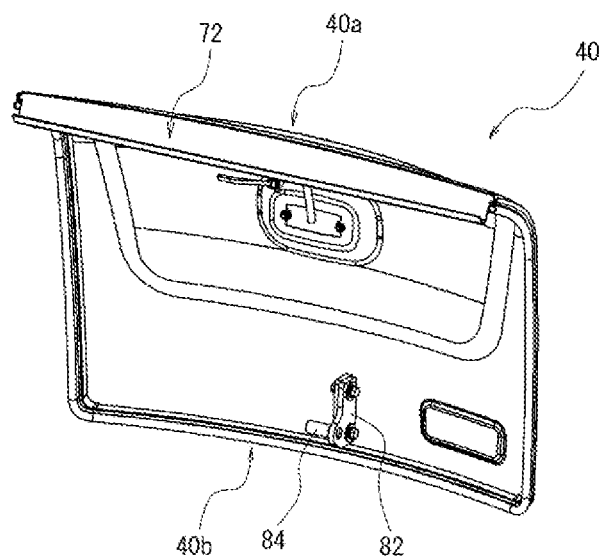
FIG. 9 is a perspective view illustrating an example of the cover of the working vehicle illustrated in FIG. 1.

Next, the equipment room 20 according to the present embodiment is described. In the present embodiment, the power source 31 (fixedly set up inside the above-mentioned power source pack 35) which supplies electric power to an electric motor for driving a hydraulic pump, and the power supply circuit 30 are arranged inside the equipment room 20 provided at the rear portion of the working vehicle 1. As illustrated in FIG. 3 and FIG. 9, the equipment room 20 includes an opening portion 41 which is used to perform, for example, maintenance work for applicable equipment, and the cover 40 which opens and closes the opening portion 41. As an example, the equipment room 20 (specifically, a structural member such as a wall portion or a beam) and the cover 40 are configured with use of metallic materials. However, not only this configuration is employed, but, for example, the cover 40 can be configured with use of a resin material.

Figure 10:
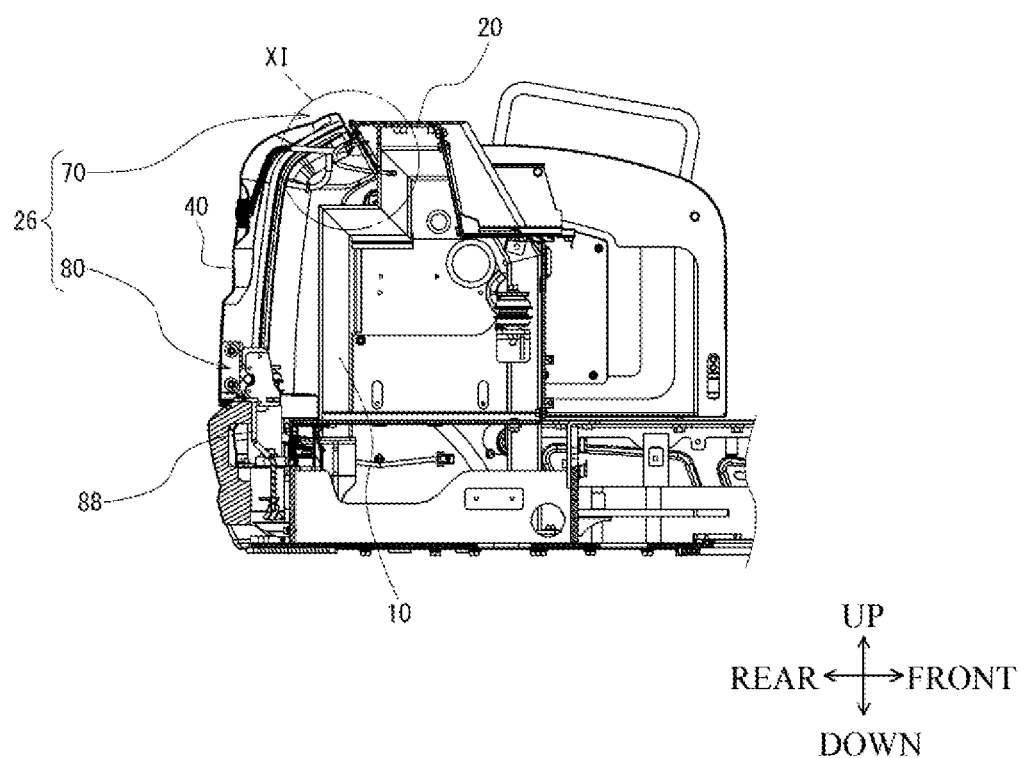
FIG. 10 is a sectional side view illustrating the example of the working vehicle illustrated in FIG. 1.

Here, as illustrated in FIG. 10, an opening and closing mechanism 26 for the cover 40 is configured to include, as a specific configuration, a latching portion 70 which latches an upper portion 40a of the cover 40 to the main body 10, and a lock portion 80 which locks a lower portion 40b of the cover 40 to the main body 10.

As a configuration example of the lock portion 80, a striker 84 is provided at the cover 40, and a hook 86 which the striker 84 engages with and disengages from, and a lock release portion 88 which releases the state of the striker 84 being engaged with and locked by the hook 86, are provided at the equipment room 20 (specifically, near the opening portion 41). Furthermore, the hook 86 and the striker 84 can be configured with use of a known mechanism, and a locked state occurs when the striker 84 engages with a predetermined portion in the hook 86. On the other hand, a mechanism in which the locked state is released by operating (in the present embodiment, pulling) the lock release lever 88 which is coupled to a release portion of the hook 86, is employed.

Figure 11:
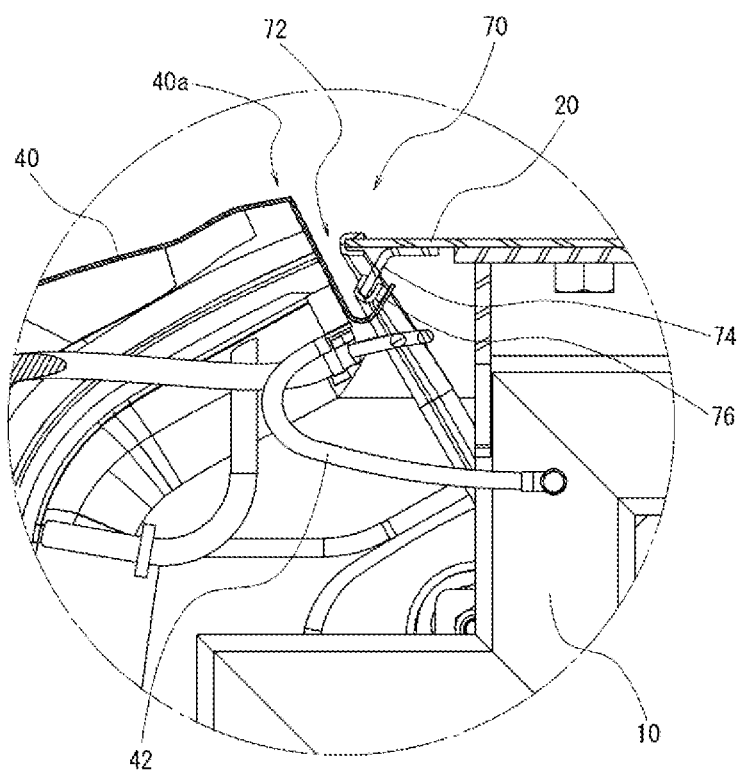
FIG. 11 is an enlarged view of a portion XI in FIG. 10.

On the other hand, as illustrated in FIG. 11 (an enlarged view of a portion XI in FIG. 10), a specific configuration of the latching portion 70 includes a latching groove 72 having a U-shaped cross section, a V-shaped cross section, or an arc-shaped cross section, which is provided at the upper portion 40a of the cover 40 and is open upward, and a latching projection 74 which is provided at a corresponding predetermined position of the main body 10 (in the present embodiment, the upper edge portion of the opening portion 41) and projects downward to be latched to the latching groove 72.

Specifically, the latching groove 72 has a groove shape formed to be continuous along the right-left direction of the main body 10. On the other hand, the latching projection 74 has a plate shape formed to be continuous along the right-left direction of the main body 10. However, the latching projection 74 is not limited to such a continuous shape, but can have an intermittent shape (for example, a plate shape or a conical shape) (not illustrated).

According to the above-described configuration, in a lock release state (a state in which the striker 84 has come off from the hook 86), the cover 40 is able to be turned (i.e., opened and closed) with respect to the main body 10 with the latching projection 74 latched to the latching groove 72. Additionally, the worker is able to separate (i.e., detach) the cover 40 from the main body 10 (specifically, the equipment room 20) by turning the cover 40 upward by a predetermined angle and then pulling the cover 40 rearward (depending on angles, in some cases, up rearward or down rearward). Furthermore, in the present embodiment, to prevent the latching groove 72 and the latching projection 74, each of which is made from, for example, a metallic material, from directly coming into sliding contact with each other and thus becoming worn, a protective cap 76 which is made from a material such as rubber or elastomer and is elastically deformable is attached to, for example, the forefront portion of the latching projection 74.

In this way, the latching portion 70 does not have, for example, a hinge or hinge brace, so that it is possible to easily separate (detach) the cover 40 from the main body 10. This enables causing the opening portion 41 of the equipment room 20 to be exposed outside with the cover 40 separated (detached). Accordingly, a broad work space which is not blocked by the cover 40 is able to be secured, so that, in performing maintenance work on equipment arranged inside the equipment room 20, it becomes possible to attain a marked improvement in workability. Furthermore, since the latching groove 72 in the latching portion 70 has a groove shape formed to be continuous along the right-left direction of the main body 10, according to the present embodiment, an advantageous effect of discharging rainwater by using the latching groove 72 as a gutter to cause rainwater to pass through the latching groove 72 and flow to the end portions thereof in the right-left direction can also be attained.

Furthermore, as a modification example of the latching portion 70, unlike the above-described configuration, a configuration in which a latching projection which projects downward is provided at the upper portion 40a of the cover 40, a latching groove having a U-shaped cross section, a V-shaped cross section, or an arc-shaped cross section, which is open upward, is provided at a corresponding predetermined position of the equipment room 20 (the upper edge portion of the opening portion 41), and the latching projection is latched to the latching groove and is thus turned can be employed (not illustrated).

Here, as a characteristic configuration in the present embodiment, a conduction cable 42 is provided which interconnects the cover 40 and the main body 10 in such a manner that the cover 40 and the main body 10 are electrically conductive and equal in electric potential to each other. The inventors of the present invention considered that employing this configuration would enable attaining a solution to an issue in which noise was radiated from the cover 40 into the air, as with a solution to the above-mentioned issue in which noise was radiated from the front pole 50 and the rear pole 60 into the air. However, as a result of doing an actual experiment, the inventors found that noise radiation was not prevented or reduced in the case of the cover 40, unlike the case of the front pole 50 and the rear pole 60.

With regard to this result, when further conducting a study, the inventors found that, in a case where the lock portion 80 which locks the cover 40, was in an electrically conductive state, i.e., in a case where the lock portion 80 was in an electrically conductive state via the striker 84 and the hook 86, if the above-mentioned conduction cable 42 was additionally provided, two electrically conductive portions between the cover 40 and the main body 10 appeared and an electrical loop circuit was formed undesirably, so that the conduction cable 42 became a cause of not being able to attain the effect of preventing or reducing noise radiation from the cover 40.

Therefore, the working vehicle 1 according to the present embodiment employs a configuration in which the cover 40 and the striker 84 are not electrically conductive to each other. Specifically, in such a configuration, applying insulation paint using, for example, plastic paint to a striker bracket 82 attached to the cover 40 to support the striker 84 brings about a state in which the cover 40 and the striker 84 are not electrically conductive to each other. However, the present embodiment is not limited to this, but, as a modification example, instead of or in addition to a configuration in which the cover 40 and the striker 84 are not electrically conductive to each other, a configuration in which the main body 10 and the hook 86 are not electrically conductive to each other can be employed (not illustrated).

The above-described configuration prevents an electrical loop circuit from occurring and then provides the effectiveness of a noise radiation prevention or reduction effect which is obtained by a configuration in which the cover 40 and the main body 10 are made electrically conductive and equal in electric potential to each other by the conduction cable 42.

As described above, according to aspects of the present invention, in a working vehicle equipped with a configuration in which a hydraulic pump is driven by an electric motor, it is possible to prevent or reduce any radiation of noise originating mainly from a power supply circuit into the air.

Furthermore, the present invention is not limited to the above-described embodiment, but can be altered in various manner within a range not departing from the present invention. Particularly, while the excavator has been described as an example of a working vehicle, the working vehicle is not limited to this, and, naturally, the present invention can also be similarly applied to, for example, another type of working vehicle such as a loader or a carrier.

What is claimed is:

1. A working vehicle including a work unit which is hydraulically driven and a control room adapted to perform an operation on the work unit, a hydraulic pump which is driven by an electric motor, a power source and a power supply circuit which supply electric power to the electric motor, and a main body which supports the work unit, the control room, the hydraulic pump, the electric motor, the power source, and the power supply circuit, the working vehicle comprising:
    a plurality of fixation components fixed to the main body; and
    a first fixation mechanism which fixes a first fixation component of the plurality of fixation components to the main body, includes a first conductor, a first conduction member which makes the first conductor and the main body electrically conductive to each other, and a second conduction member which makes the first conductor and the first fixation component electrically conductive to each other, and is configured such that the main body and the first fixation component are electrically conductive to each other via the first conductor, the first conduction member, and the second conduction member and are equal in electric potential to each other,
    wherein the main body is configured to be electrically conductive and equal in electric potential to a ground pole of the power supply circuit, and
    the first conductor is (i) covered by a resin mat laid on a floor portion of the control room and is (ii) present in an unexposed state.

2. The working vehicle according to claim 1, wherein the first fixation component has an outer surface painted, and
    wherein the first fixation mechanism is configured such that, in a state in which a first conduction plate serving as the first conductor is caused to directly, or via an intervening member, come into abutting contact with a first fixed portion provided at a predetermined region of the first fixation component, the first fixation component is fixed to the main body with inclusion of a first bolt serving as the first conduction member inserted into a first insertion hole formed in a communicating manner in the first conduction plate and the first fixed portion and screwed to the main body and a second bolt serving as the second conduction member inserted into a second insertion hole formed in the first conduction plate and screwed to the first fixed portion.

3. The working vehicle according to claim 2, wherein the first conduction plate is configured to have a whole surface thereof plated.

4. The working vehicle according to claim 3,
    wherein the control room includes one or a plurality of front poles erected at a front portion of the main body configured as the floor portion, and
    wherein the first fixation component is the one or the plurality of front poles.

5. The working vehicle according to claim 1, further comprising a second fixation mechanism which fixes a second fixation component of the plurality of fixation components to the main body, includes a second conductor, a third conduction member which makes the second conductor and the main body electrically conductive to each other, and a fourth conduction member which makes the second conductor and the second fixation component electrically conductive to each other, and is configured such that the main body and the second fixation component are electrically conductive to each other via the second conductor, the third conduction member, and the fourth conduction member and are equal in electric potential to each other.

6. The working vehicle according to claim 5, wherein the second fixation component has an outer surface painted, and
    wherein the second fixation mechanism is configured such that, in a state in which a second conduction plate serving as the second conductor is caused to directly, or via an intervening member, come into abutting contact with a second fixed portion provided at a predetermined region of the second fixation component, the second fixation component is fixed to the main body with inclusion of a third bolt serving as the third conduction member inserted into a third insertion hole formed in a communicating manner in the second conduction plate and the second fixed portion and screwed to the main body and a fourth bolt serving as the fourth conduction member inserted into a fourth insertion hole formed in the second conduction plate and screwed to the second fixed portion.

7. The working vehicle according to claim 6, wherein the second conduction plate is configured to have a whole surface thereof plated and then painted on the plating.

8. The working vehicle according to claim 7, further comprising a control room which is used to perform an operation on the work unit,
wherein the control room includes one or a plurality of rear poles erected at a rear portion of the main body, and
wherein the second fixation component is the one or the plurality of rear poles.

9. The working vehicle according to claim 4, wherein the control room includes a lamp arranged therein, and a power supply line for supplying electric power to the lamp is arranged inside at least one of the one or the plurality of front poles.

10. The working vehicle according to claim 9, wherein the first fixation mechanism is configured such that the first conduction plate is covered in an unexposed state by the resin mat laid on the floor portion.

11. The working vehicle according to claim 3, wherein the main body has an outer surface painted and includes a screw portion to which the first bolt is screwed, which is configured to be in a paintless state by retap processing.

12. The working vehicle according to claim 8, wherein the second conduction plate has an outer surface painted and includes an opening portion peripheral border region of the third insertion hole and an opening portion peripheral border region of the fourth insertion hole, which are configured to be in a paintless state by masking processing.

13. The working vehicle according to claim 1, further comprising an equipment room in which the power source is mounted,
wherein the equipment room includes a cover for performing opening and closing, a striker provided at the cover, and a hook provided at the main body, the striker being engageable with and disengageable from the hook, includes one or both of a configuration in which the cover and the striker are not electrically conductive to each other and a configuration in which the main body and the hook are not electrically conductive to each other, and is configured to include a conduction cable connecting the cover and the main body in such a manner that the cover and the main body are electrically conductive and equal in electric potential to each other.

14. A working vehicle including a work unit which is hydraulically driven, a hydraulic pump which is driven by an electric motor, a power source and a power supply circuit which supply electric power to the electric motor, and a main body which supports the work unit, the hydraulic pump, the electric motor, the power source, and the power supply circuit, the working vehicle comprising:
a plurality of fixation components fixed to the main body; and
a first fixation mechanism which fixes a first fixation component of the plurality of fixation components to the main body, includes a first conductor, a first conduction member which makes the first conductor and the main body electrically conductive to each other, and a second conduction member which makes the first conductor and the first fixation component electrically conductive to each other, and is configured such that the main body and the first fixation component are electrically conductive to each other via the first conductor, the first conduction member, and the second conduction member and are equal in electric potential to each other,
wherein the main body is configured to be electrically conductive and equal in electric potential to a ground pole of the power supply circuit,
wherein the first fixation component has an outer surface painted, and
wherein the first fixation mechanism is configured such that, in a state in which a first conduction plate serving as the first conductor is caused to directly, or via an intervening member, come into abutting contact with a first fixed portion provided at a predetermined region of the first fixation component, the first fixation component is fixed to the main body with inclusion of a first bolt serving as the first conduction member inserted into a first insertion hole formed in a communicating manner in the first conduction plate and the first fixed portion and screwed to the main body and a second bolt serving as the second conduction member inserted into a second insertion hole formed in the first conduction plate and screwed to the first fixed portion.

15. The working vehicle according to claim 14, wherein the first conduction plate is configured to have a whole surface thereof plated.

16. The working vehicle according to claim 15, further comprising a control room which is used to perform an operation on the work unit,
wherein the control room includes one or a plurality of front poles erected at a front portion of the main body configured as a floor portion, and
wherein the first fixation component is the one or the plurality of front poles.

17. The working vehicle according to claim 14, further comprising a second fixation mechanism which fixes a second fixation component of the plurality of fixation components to the main body, includes a second conductor, a third conduction member which makes the second conductor and the main body electrically conductive to each other, and a fourth conduction member which makes the second conductor and the second fixation component electrically conductive to each other, and is configured such that the main body and the second fixation component are electrically conductive to each other via the second conductor, the third conduction member, and the fourth conduction member and are equal in electric potential to each other.

18. The working vehicle according to claim 17, wherein the second fixation component has an outer surface painted, and
wherein the second fixation mechanism is configured such that, in a state in which a second conduction plate serving as the second conductor is caused to directly, or via an intervening member, come into abutting contact with a second fixed portion provided at a predetermined region of the second fixation component, the second fixation component is fixed to the main body with inclusion of a third bolt serving as the third conduction member inserted into a third insertion hole formed in a communicating manner in the second conduction plate and the second fixed portion and screwed to the main body and a fourth bolt serving as the fourth conduction member inserted into a fourth insertion hole formed in the second conduction plate and screwed to the second fixed portion.

19. The working vehicle according to claim 18, wherein the second conduction plate is configured to have a whole surface thereof plated and then painted on the plating.

20. A working vehicle including a work unit which is hydraulically driven, a hydraulic pump which is driven by an electric motor, a power source and a power supply circuit which supply electric power to the electric motor, and a main body which supports the work unit, the hydraulic pump, the electric motor, the power source, and the power supply circuit, the working vehicle comprising:
- a plurality of fixation components fixed to the main body; and
- a first fixation mechanism which fixes a first fixation component of the plurality of fixation components to the main body, includes a first conductor, a first conduction member which makes the first conductor and the main body electrically conductive to each other, and a second conduction member which makes the first conductor and the first fixation component electrically conductive to each other, and is configured such that the main body and the first fixation component are electrically conductive to each other via the first conductor, the first conduction member, and the second conduction member and are equal in electric potential to each other,
wherein the main body is configured to be electrically conductive and equal in electric potential to a ground pole of the power supply circuit, further comprising an equipment room in which the power source is mounted,
wherein the equipment room includes a cover for performing opening and closing, a striker provided at the cover, and a hook provided at the main body, the striker being engageable with and disengageable from the hook, includes one or both of a configuration in which the cover and the striker are not electrically conductive to each other and a configuration in which the main body and the hook are not electrically conductive to each other, and is configured to include a conduction cable connecting the cover and the main body in such a manner that the cover and the main body are electrically conductive and equal in electric potential to each other.

* * * * *